United States Patent Office 3,594,141
Patented July 20, 1971

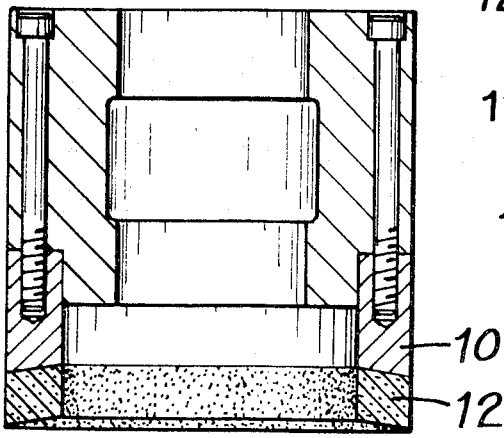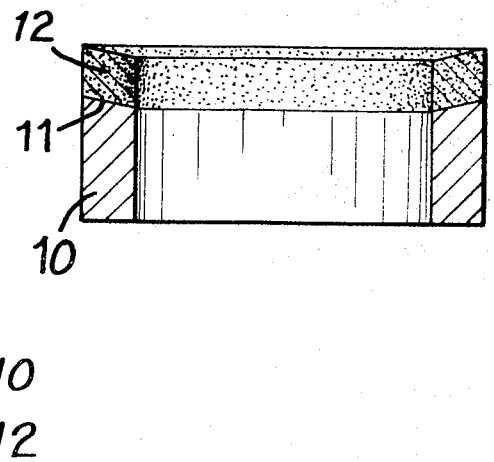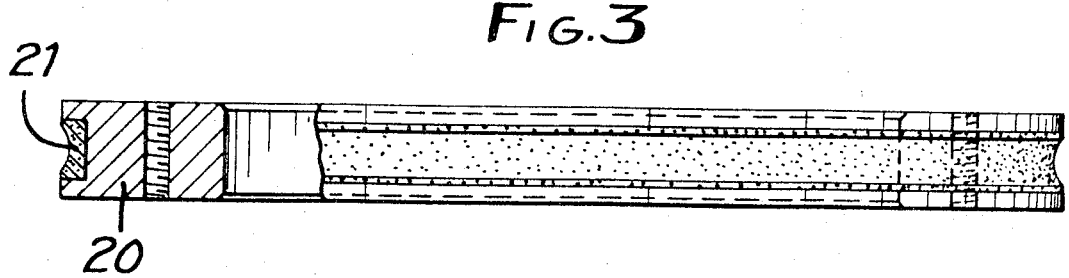

3,594,141
METHOD FOR MAKING A METAL BONDED DIAMOND ABRASIVE TOOL
Robert S. Houston and Reginald C. Fisk, West Boylston, Mass., assignors to Norton Company, Worcester, Mass.
Continuation-in-part of application Ser. No. 296,553, July 22, 1963, which is a continuation-in-part of application Ser. No. 25,268, Apr. 28, 1960. This application Mar. 6, 1967, Ser. No. 620,717
Int. Cl. B24b 1/00
U.S. Cl. 51—295                                    8 Claims

ABSTRACT OF THE DISCLOSURE

A method for making a metal bonded abrasive tool using powdered metal techniques, the tool having a controlled degree of relative hardness of its cutting action built into the tool during manufacture, the control being accomplished by producing a specified porosity in the abrasive section of the tool, and then infiltrating the pores with liquified metal produced during a second phase of the sintering operation, the liquid metal for infiltrating being drawn from the support backing for the abrasive tool.

CROSS-REFERENCE TO A RELATED APPLICATION

Applicants incorporate into the disclosure of the present invention, the application Ser. No. 296,553 of Robert S. Houston, filed on July 22, 1963 and entitled "Grinding Wheel" which is a continuation-in-part of application Serial No. 25,268, filed Apr. 28, 1960 both applications now abandoned and both having Norton Company, Worcester, Mass., as common assignee.

BACKGROUND OF THE INVENTION

The field of the invention comprehends the making of abrasive tools wherein a porous abrasive containing section is infiltrated to provide a cutting tool, the process of this invention being designed to facilitate the manufacture of such a tool as is described in the Houston application.

The present invention is particularly related to a process for making metal bonded diamond abrasive tool sections carried on a backing or hub made from a molded powdered metal preform.

This invention can be used with both natural and synthetic diamonds for the manufacture of bonded diamond abrasive products and the resulting products find their greatest application as bonded diamond sections mounted on backings, centers or hubs to form saw blades, honing sticks, dressing or sharpening tools, grinding wheels and the like. The diamond sections are of course mounted in the best manner to produce a useful grinding surface and the less expensive backing materials serve first in this process as a reservoir for the infiltrating material and in the finished tools the backings provide a means for mounting the abrasive tools on appropriate grinding machines or for otherwise supporting the diamond sections.

The known metal bonded diamond tools, with the exception of the tool disclosed in the previously mentioned Houston application, are made to have a very dense specification to promote long tool life. However, when the denser tools of the prior art are used, the tools tend to be slower cutting and frequently become glazed in use, requiring frequent dressing. These denser tools have a cutting characteristic that is called hard in the grinding art. In order to produce a softer grinding action the metal bonded diamond portion of the tools must be made somewhat porous so that the tool automatically breaks down in use to become self-sharpening. When following the prior art processes for making metal bonded diamond tools, it has been impossible to control the degree of porosity in the abrasive section as desired in order to manufacture tools having the precise degree of softness required for a particular grinding operation. In fact in the past, the usual tungsten carbide cobalt bonded diamond tools are either nearly completely dense or extremely porous because once the sintering action has been initiated, it proceeded too rapidly to control precisely.

To overcome this deficiency in being able to precisely control the cutting action of metal bonded diamond tools as described in the previously mentioned Houston application, an infiltrated porous structure is fabricated which can be designed to have a specified degree of hardness or softness in its cutting action. The difficulties of manufacturing the prior art structures to accomplish the desired cutting action, as well as the manner in which a relatively exact control of the cutting action of a metal bonded diamond tool is attained, are fully discussed in the mentioned Houston application.

This present invention is concerned with a new process for accomplishing the same result disclosed in the copending Houston application.

SUMMARY OF THE INVENTION

It is an object of this invention to provide an improved method for manufacturing a metal bonded abrasive tool having an infiltrated construction to control the degree of hardness or softness of the cutting action.

It is a particular object of this invention to provide a method for simultaneously sintering the metal bond matrix for supporting a diamond abrasive and sintering a powder metal preform to which the abrasive section is attached, and after completion of sintering, to continue with the heating step to complete an infiltrating action to fill the porous metal bonded diamond section with an infiltrant to complete the tool.

Another object of the invention is to provide a method whereby the wheel backing and an infiltrated metal bonded abrasive carrying section can be integrated in a two-stage sintering and infiltrating process.

The above objects are accomplished by combining known power metallurgical procedures to accomplish a new sequence of operations. The diamond abrasive is mixed with a conventional metal bond mix such as tungsten carbide and cobalt. The diamond grits are thoroughly and uniformly distributed throughout a mass of these metal bonding components which have been reduced in size to below 5 microns.

A backing support for the diamond containing section is formed of a mixture including, for example, an iron powder of approximately 100 mesh having mixed therewith an infiltrant bronze powder reduced to approximately 325 mesh size, which is to be used for filling the pores of the metal bonded diamond abrasive section for the purpose taught in the Houston application. A uniform mixture of such ingredients is first cold pressed to form the desired shape of backing member. Sufficient pressure is used to make certain that the iron particles of the mixture described above, are in relatively intimate contact one with another, with the finer infiltrant powder trapped in the spaces between the larger iron particles.

The diamond grits and its metal bonding mixture is then placed in a molding press next to the preformed support element and the abrasive containing section is then pressed into tight contact with the backing or support element. The degree of pressure applied to effect this mating of these elements is controlled, and is just sufficient to produce a previously determined degree of porosity in the abrasive section which will ultimately be filled with infiltrant material to produce the desired degree of hardness or softness in the resulting cutting tool.

The combined or composite of cold pressed elements, namely, the backing element and the abrasive section pressed onto it for support, are then subjected to a heating procedure for sintering the tungsten carbide and cobalt components of the abrasive section and the iron particles in the backing element to make the tool rigid and self-sustaining. This sintering operation is accomplished at a temperature below the fusion temperature of the bronze infiltrant dispersed in the backing, which preformed element thus serves as a reservoir for the infiltrant during this portion of the process. After the desired degree of sintering has been accomplished, the temperature is raised to above the fusion temperature of the bronze infiltrant to render it liquid. Because the particle size of the tunsten carbide and cobalt used for bonding the diamond grits was chosen to be in a 2 to 4 micron range, and the iron particles selected for the backing matrix were of a 100 mesh range, the system of relatively minute pores in the diamond containing section draws the liquid infiltrant from the backing matrix by capillary action until all of the interconnecting pores of the abrasive section are filled. After the infiltrating step is completed, the assembly is cooled and infiltrated tool may be cleaned and dressed to ready it for use.

The essential feature of the present invention is concerned with the selection of particle sizes for the metal bond components used respectively in the abrasive section and the backing section so that the backing serves as a reservoir for the infiltrant until the capillary action is set up for moving the infiltrant from the backing into the abrasive section. This makes possible the performance of a much simpler two-stage firing procedure to complete the sintering and infiltration of the porous abrasive section of the tool disclosed in the Houston application.

DESCRIPTION OF THE DRAWINGS

FIG. 1 is a view showing a completed tool of this invention mounted on a tool carrier.

FIG. 2 is a disclosure showing the various sections of a lens grinding tool made in accordance with this invention the parts being shown assembled in the "green" state.

FIG. 3 shows a completed tool made in accordance with this invention having a different form that may be used for pencil edging glass plates.

DESCRIPTION OF THE PREFERRED FORM OF THE INVENTION

In making a tool in accordance with the preferred teaching of this invention, a mixture of materials to produce a backing or support element for a grinding wheel is made of powdered iron and bronze. This mixture is then preformed to provide a wheel supporting element for the abrasive section of the tool such as is shown in the drawings.

The backing mixture preferably takes the form of about 80% iron particles and 20% bronze by weight. The iron is reduced to a powder having a size in the range of approximately 100 mesh and the bronze is reduced to a powder having a size in the range of 325 mesh. Bronze in a typical wheel of my invention may be comprised of an alloy that is 82% copper and 18% tin. After these ingredients are blended the mixture is placed in a mold and compacted to produce a backing shape for a lens grinding tool such as 10 in FIG. 2. The loose powder is compacted in the mold and with a sufficient degree of pressure to force substantially all of the iron particles to be in touching contact one with another. In the mix of 80% iron of 100 mesh and 20% bronze of 325 mesh, it is apparent that the smaller bronze particles are forced into the spaces left between the larger iron particles when the iron particles are forced into touching relationship. In the form of the tool shown in FIG. 2 the upper surface 11 of backing 10 is provided with a conical shape for the purpose of supporting a lens grinding diamond abrasive section 12.

The diamond abrasive element may be formed by mixing diamond grits of approximately 120 grit with a metal bonding mixture formed of 40% by weight tungsten carbide powder having a size range of 1 to 4 microns and 60% by weight cobalt powder of the same particle size range. For lens and other glass grinding operations, said diamond particles are preferably supported in such a tungsten carbide cobalt bond in about 100 concentration that is about 25% by volume of the mixture being diamonds. The diamond grits are evenly distributed throughout the mix to complete the blending.

The diamond grits and their metal bonding mixture are then filled into the mold on top of the preformed backing 10 and are cold pressed in the mold with a pressure of about 35 tons per square inch. It will be seen by an inspection of FIG. 2, that the total volume of backing 10 is somewhat larger than the volume of diamond section and this volume relationship is designed for a purpose that will be explained more fully below. In following the practice of this invention, the volume of the backing should be at least three times and preferably four times or more larger than the volume of the diamond abrasive section pressed onto the conical surface 11.

The composite cold pressed elements may then be removed from the mold and it will be found that they are quite rigid and self-sustaining in this "green" state. The assembled elements are then ready for firing and the structure described above is placed in heating means to be subjected to a temperature in the range of 800° C. for about 30 minutes under non-oxidizing, inert or reducing atmosphere. At this temperature the tungsten carbide cobalt mixture sinters to form a rigid matrix for supporting the diamond grits and the iron particles in the backing member are sintered together to form a solid matrix around the bronze alloy particles distributed throughout the mass of the backing.

For the manufacture of lens grinding or pencil edging diamond tools, the pressure of 35 tons per square inch used for consolidating the diamond section and backing, effects an initial compaction of the diamond grits, tungsten carbide and cobalt to a mass having about 30% pores, in the form of an interconnecting system through its entire volume. These pores produced at the cold pressing stage provide a continuous network of interconnecting pores having a diameter of about 1 to 2 microns in the diamond section, which pore system remains substantially unchanged during the sintering operation.

After completion of sintering of the metal bonding matrix for the diamond section and the iron particles in the backing section 10, at a temperature below the fusion temperature of the bronze infiltrant carried in the backing, the temperature in the heating means is raised to 950° C. to liquify the bronze. This heating step is continued in the non-oxidizing, inert or reducing atmosphere and as the bronze is liquified, it flows into the system of pores in the diamond section. Heating to 950° C. is continued for about 30 minutes until the bronze infiltrates throughout the entire interconnecting pore system in the diamond abrasive section.

It has been found that the liquid bronze will flow from the iron matrix or reservoir produced by sintering the relatively large iron particles, into the pores of the tungsten carbide cobalt matrix of the diamond section because of the difference in size of the interconnecting porous network in the diamond section as compared with the spaces between the iron particles forming the matrix in the backing section. Due to capillary action, the liquid will flow from the larger spaces between the iron particles into the smaller diameter interconnected pore system of the abrasive section.

The backing element as mentioned above is intentionally constructed to have a volume that is at least three times or more larger than the volume of the abrasive section. It has been found that unless a sufficient reservoir of liquid infiltrant can be provided in the backing, that complete infiltration will not always take place. The provision of a backing having a volume at least three times larger than the volume to be infiltrated, ensures that sufficient liquid infiltrant is always available at the interface between the two sections to effect complete filling of the interconnecting pore system in the abrasive element.

After heating the tool at 950° C. for about 30 minutes the infiltrating step will be completed. The tool may then be cooled and dressed for use. It will be found upon cooling that none of the infiltrant overflows the outer walls of the abrasive section and only rarely can it be detected from an external inspection that the pore system has been filled. Therefore, after cooling, the surface of the tool can be trued to ready it for use, without requiring a preliminary cleaning operation as is necessary in making the infiltrated tool described in the copending Houston application.

A tool constructed in the form shown in FIG. 1, having the conical grinding surface there disclosed, is used for lens grinding. As taught in the Houston application when a diamond tool is made having an abrasive section bonded with a 40% tungsten carbide and 60% cobalt matrix that is filled with a bronze infiltrant which occupies about 30% of the volume of the abrasive element of the tool, the desired control of the degree of hardness or softness of grinding action is attained. The improved process for producing this infiltrated tool, by the invention here disclosed making use of a two-stage firing procedure simplifies the production of such a tool. It is obvious that the furnacing operation can be performed more efficiently in the single two-stage continuous heating program here described and the tooling required to complete fabrication and infiltration of the tool is minimized.

A pencil edging tool for use in grinding the edges of glass sheets is shown in FIG. 3. In following this invention to produce such a structure, the backing element 20 can be made of the above described 80%–20% iron and bronze mixture by weight, and diamond section 21 can likewise be formed of a 40%–60% tungsten carbide and cobalt mix by weight that can be compressed against the periphery of section 20 in any well known manner. The diamond and backing sections as above described are pressed at about 35 tons per square inch to produce a "green" compacted mass with the diamond containing section having 30% pores. This assembly may be fired in the identical two-stage firing procedure described above.

In the practice of this invention, various infiltrating alloys may be used, in the form of bronze compositions, silver solders, brasses and elemental copper.

Bronze compositions in the range of from 90% to 75% copper, and 10% tin to 25% tin respectively are suggested for use. Preferably a bronze infiltrant formed of 82% copper and 18% tin by weight is used.

Typical commercial silver solders such as the following may be used:

(a) 25 Ag/52.5 Cu/22.5 Zn by weight
(b) 45 Ag/15 Cu/16 Zn/24 Cd by weight
(c) 54 Ag/40 Cu/5 Zn by weight
(d) 72 Ag/28 Cu by weight A copper alloy that meets the specifications for use as an infiltrant is 90 Cu/5 Fe/5 Mn by weight.

All of the infiltrants suggested above, have a fusion temperature in the range of between 700° and 1100° C. Such infiltrants can all be used in accordance with the teaching of this invention which provides for the two-step, sintering and infiltrating process.

The infiltrants may be initially mixed with the iron or other metal particles used for forming the matrix of the backing material, in the ratios of between approximately from 9 parts matrix to 1 part infiltrant, to 7½ parts matrix to 2½ infiltrant by weight. In place of iron powder it is suggested that any of the metals selected from Group VIII of the Periodic Table of elements may be used provided the metal has a melting point higher than the fusion temperature of the infiltrant selected for use therewith.

The mixture of the diamond grits and metal bond for the abrasive section may be prepared in following the usual blending techniques. Diamond concentrations in the order of 25, 50, 75 and 100 may be used. This means that there will be from about 6% to 25% by volume of diamonds in the completed diamond section. Diamond tools have been made with diamonds in the range of from 16 to 2000 in grit size but the more conventional tools are fabricated with grits in the range of from 46 to 400 mesh.

Metal bonding mixtures for the abrasive section can include tungsten carbide and other similar carbides such as carbides of chromium, tantalum, vanadium, titanium. The ratio of carbide to cobalt may be varied from 20% carbide to 90% carbide by weight with from 80 to 10% cobalt by weight in the carbide cobalt mixture respectively. I prefer a mixture having about 40 parts by weight tungsten carbide to 60 parts by weight cobalt for producing the glass grinding tool elements used to illustrate the preferred form of the invention.

While this invention finds particular usefulness in connection with the manufacture of tungsten carbide, cobalt bonded diamond tools, it is obvious that other abrasive grits such as silicon carbide, alumina, or other conventional abrasives can be substituted for the diamond grits.

In following this invention and as described in the previously mentioned copending application, the molding or cold pressing operation is controlled to produce the desired porosity in the abrasive element. Pressures in the range of 10 to 50 tons per square inch have been used for producing the desired porosity in the abrasive section to be infiltrated whereby to control the degree of hardness or softness of the cutting action in the finished tool, in accordance with this process. As fully explained in the previous application, the initial control of porosity in the abrasive section prior to sintering and infiltrating is important in order to produce a final wheel having the desired grinding characteristics insofar as softness or hardness of the grinding operation is concerned.

The foregoing description covers the preferred method of this invention but many modifications thereof may occur to those skilled in the art which will fall within the scope of the following claims.

What is claimed is:

1. A method for making a bonded abrasive tool having an abrasive section containing abrasive grains supported in a sintered infiltrated metal matrix, and a backing section made from a mixture of a sinterable metal selected from Group VIII of the Periodic Table of elements comprising mixing a fusible metal with the Group VIII metal, forming said abrasive section to have a given volume of interconnecting pores, and forming said backing section to have a volume of fusible metal infiltrant therein greater than three times said given pore volume, heating the assembled backing section and abrasive section at a temperature below the fusion point of the fusible metal but sufficiently high to sinter the matrix of the abrasive section and said Group VIII metal, holding the temperature below the fusion temperature of the fusible metal for a time period sufficient to complete the sintering step and then raising the heating temperature after completion of sintering to liquify the infiltrant and causing it to infiltrate the matrix of the abrasive section, and then cooling and dressing the completed tool.

2. The method of claim 1, comprising mixing diamond grains in an amount equal to about 6 to 25% by volume of said abrasive section, with tungsten carbide and cobalt particles within the range of 1 to 4 microns in size, an mixing a bronze powder of 325 mesh in iron powder of 100 mesh, and accomplishing said forming by cold pressing the respective mixes under a pressure of from 10 to 50 tons per square inch.

3. The method of claim 1, comprising mixing diamond grains in an amount equal to about 6 to 25% by volume of said abrasive section with tungsten carbide and cobalt particles within the range of 1 to 4 microns in size, and mixing a silver solder of 325 mesh in iron powder of 100 mesh, and accomplishing said forming by cold pressing the respective mixes under a pressure of 10 to 50 tons per square inch.

4. The method of claim 2, wherein the matrix for supporting the abrasive grain comprises a mixture of a carbide selected from the group consisting of tungsten carbide, vanadium carbide and titanium carbide and a metal selected from the group consisting of cobalt and nickel, and said mixture of abrasive and matrix material is formed at a pressure of from 10 to 50 tons per square inch.

5. The method of claim 1, wherein said abrasive section is formed to have a volume of interconnecting pores of between about 20 and 50% by volume.

6. The method of claim 4, wherein said abrasive section is formed to have pores with a diameter of approximately 1 to 2 microns.

7. The method of claim 1, wherein said fusible metal has a melting point between 700° C. and 1100° C., and said sintering of the matrix and backing section is accomplished at a temperature below the melting point of the infiltrant.

8. The method of claim 2, wherein said formed abrasive and backing section of the abrasive tool are heated first at about 800° C. for 30 minutes and then at about 950° C. for about 30 minutes, both of said heating steps being performed in a non-oxidizing atmosphere.

References Cited

UNITED STATES PATENTS

| | | | |
|---|---|---|---|
| 2,137,201 | 11/1938 | Boyer | 51—309 |
| 2,173,835 | 9/1939 | Boyer et al. | 51—309 |
| 2,349,825 | 5/1944 | Kelleher | 51—309 |
| 2,358,459 | 9/1944 | Kelleher | 51—309 |
| 2,358,460 | 9/1944 | Kelleher | 51—309 |
| 2,405,086 | 7/1946 | Bevillard | 51—309 |
| 2,609,285 | 9/1952 | Thomas | 51—309 |
| 2,630,383 | 3/1953 | Schwartz et al. | 51—309 |
| 2,828,197 | 3/1958 | Blackmer | 51—309 |

DONALD J. ARNOLD, Primary Examiner

U.S. Cl. X.R.

51—309

UNITED STATES PATENT OFFICE
CERTIFICATE OF CORRECTION

Patent No. 3,594,141　　　　　　　　Dated July 20, 1971

Inventor(s) Robert S. Houston, et al

It is certified that error appears in the above-identified patent and that said Letters Patent are hereby corrected as shown below:

On the cover sheet, in the heading "Continuation-in-part of application Ser. No. 296,553, July 22, 1963, which is a continuation-in-part of application Ser. No. 25,268, Apr. 28, 1960." should be cancelled.

Signed and sealed this 31st day of October 1972.

(SEAL)
Attest:

EDWARD M. FLETCHER, JR.　　　　　　　ROBERT GOTTSCHALK
Attesting Officer　　　　　　　　　　　Commissioner of Patents